United States Patent
Arai et al.

(10) Patent No.: US 10,963,602 B2
(45) Date of Patent: Mar. 30, 2021

(54) DEVICE FOR PREDICTING AMOUNT OF PHOTOVOLTAIC POWER GENERATION, AND METHOD FOR PREDICTING AMOUNT OF PHOTOVOLTAIC POWER GENERATION

(71) Applicant: Mitsubishi Electric Corporation, Tokyo (JP)

(72) Inventors: Takashi Arai, Tokyo (JP); Satoko Sakajo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 631 days.

(21) Appl. No.: 15/741,016

(22) PCT Filed: Aug. 7, 2015

(86) PCT No.: PCT/JP2015/072548
§ 371 (c)(1),
(2) Date: Dec. 29, 2017

(87) PCT Pub. No.: WO2017/026010
PCT Pub. Date: Feb. 16, 2017

(65) Prior Publication Data
US 2018/0196896 A1 Jul. 12, 2018

(51) Int. Cl.
*G06F 30/20* (2020.01)
*G09B 9/08* (2006.01)
(Continued)

(52) U.S. Cl.
CPC .......... *G06F 30/20* (2020.01); *G01R 21/133* (2013.01); *G01W 1/10* (2013.01); *G06Q 10/00* (2013.01);
(Continued)

(58) Field of Classification Search
CPC ...... G06F 30/20; G06F 30/00; G06F 2119/06; G01R 21/133; G01W 1/10; G06Q 10/00;
(Continued)

(56) References Cited

U.S. PATENT DOCUMENTS

| 2013/0066569 A1 | 3/2013 | Sato |
| 2014/0207437 A1* | 7/2014 | Hoff ........................ G01W 1/12 703/18 |
| 2014/0222228 A1 | 8/2014 | Sawa et al. |

FOREIGN PATENT DOCUMENTS

| EP | 2800221 A1 | 11/2014 |
| JP | 2006-033908 A | 2/2006 |

(Continued)

OTHER PUBLICATIONS

Summons to attend oral proceedings dated Sep. 20, 2019 issued in corresponding EP patent application No. 15900965.3.
(Continued)

*Primary Examiner* — Cedric Johnson
(74) *Attorney, Agent, or Firm* — Posz Law Group, PLC

(57) ABSTRACT

An actual power generation amount receiver acquires an actual power generation amount of a photovoltaic power generation system of each time slot of each day. An extraterrestrial solar radiation calculator calculates an extraterrestrial solar radiation of each time slot of each day at a disposition position. A weather information receiver acquires an actual weather record of each time slot of each day and a weather forecast of a prediction target time slot. A similar date extractor classifies a time slot, which is the same as a prediction target time slot of each day in a search range in which an actual power generation amount is acquired, as a similar time slot for each actual weather record type. A prediction formula deriver derives a power generation amount prediction formula for calculating a
(Continued)

| YEAR-MONTH-DAY (121) | TIME SLOT (122) | PHOTOVOLTAIC POWER GENERATION SYSTEM ID (123) | POST-ESTIMATION POWER GENERATION AMOUNT (124) |
|---|---|---|---|
| 20150701 | 0630 | 0001 | 50 |
| 20150701 | 0700 | 0001 | 100 |
| 20150701 | 0730 | 0001 | 200 |
| 20150701 | 0800 | 0001 | 500 | predicted power generation amount based on an actual power generation amount.

9 Claims, 11 Drawing Sheets

(51) Int. Cl.
  *G06Q 10/00* (2012.01)
  *G06Q 50/06* (2012.01)
  *H02S 50/00* (2014.01)
  *H02J 3/00* (2006.01)
  *G01R 21/133* (2006.01)
  *G01W 1/10* (2006.01)
  *G06F 119/06* (2020.01)
(52) U.S. Cl.
  CPC ............... *G06Q 50/06* (2013.01); *G09B 9/08* (2013.01); *H02J 3/00* (2013.01); *H02S 50/00* (2013.01); *G06F 2119/06* (2020.01); *Y02A 30/00* (2018.01)
(58) Field of Classification Search
  CPC ... G06Q 50/06; G09B 9/08; H02J 3/00; H02S 50/00; Y02A 30/12; Y02A 30/00; Y04S 10/50; Y02E 10/50
  USPC ..................................................... 703/18, 13
  See application file for complete search history.

(56) References Cited

FOREIGN PATENT DOCUMENTS

JP        2011-163973 A        8/2011
JP        5308560 B1  *  10/2013

OTHER PUBLICATIONS

Office Action dated Mar. 21, 2019 issued in corresponding EP patent application No. 15900965.3.
Extended EP Search Report dated Mar. 27, 2018 issued in corresponding EP patent application No. 15900965.3.
International Search Report of the International Searching Authority dated Sep. 29, 2015 for the corresponding international application No. PCT/JP2015/072548 (and English translation).
Naoto Ishibashi et al., "Photovoltaic Power Generation Forecasting Technology for Supporting Energy Management Systems", Fuji Electric Co Ltd., Technical Report, (2013), pp. 207-210, vol. 86, No. 3 (discussed on p. 3 of the specification) (and English abstract).
Hirofumi Irokawa et al., "Forecasting Power Generation for a Photovoltaic System in an Energy Network", IEICE Technical Report, Jul. 17, 2008, pp. 125-130, No. 108. (cited in the PCT Search Report) (and English abstract).

* cited by examiner

FIG. 2

| YEAR-MONTH-DAY | TIME SLOT | PHOTOVOLTAIC POWER GENERATION SYSTEM ID | POWER GENERATION AMOUNT |
|---|---|---|---|
| 20150701 | 0630 | 0001 | 50 |
| 20150701 | 0700 | 0001 | 100 |
| 20150701 | 0730 | 0001 | 200 |
| 20150701 | 0800 | 0001 | 500 |

FIG. 3

| YEAR-MONTH-DAY | TIME SLOT | AREA ID | WEATHER |
|---|---|---|---|
| 20150701 | 0630 | 01 | FINE |
| 20150701 | 0700 | 01 | FINE |
| 20150701 | 0730 | 01 | CLOUDY |
| 20150701 | 0800 | 01 | CLOUDY |

FIG. 10

| GROUP ID | PHOTOVOLTAIC POWER GENERATION SYSTEM ID |
|---|---|
| 001 | 0001 |
| 001 | 0002 |
| 001 | 0003 |
| 001 | 0004 |

FIG. 11

| YEAR-MONTH-DAY (91) | TIME SLOT (92) | GROUP ID (93) | WEATHER (94) | a (95) | b (96) |
|---|---|---|---|---|---|
| 20150701 | 0630 | 001 | FINE | 0.0006 | 0 |
| 20150701 | 0700 | 001 | FINE | 0.0005 | 0 |
| 20150701 | 0730 | 001 | CLOUDY | 0.0002 | 0 |
| 20150701 | 0800 | 001 | CLOUDY | 0.00015 | 0 |

| YEAR-MONTH-DAY | TIME SLOT | WEATHER | a | b |
|---|---|---|---|---|
| 20150701 | 0630 | FINE | 0.0006 | 0 |
| 20150701 | 0700 | FINE | 0.0005 | 0 |
| 20150701 | 0730 | CLOUDY | 0.0002 | 0 |
| 20150701 | 0800 | CLOUDY | 0.00015 | 0 |

| YEAR-MONTH-DAY | TIME SLOT | PHOTOVOLTAIC POWER GENERATION SYSTEM ID | POST-ESTIMATION POWER GENERATION AMOUNT |
|---|---|---|---|
| 20150701 | 0630 | 0001 | 50 |
| 20150701 | 0700 | 0001 | 100 |
| 20150701 | 0730 | 0001 | 200 |
| 20150701 | 0800 | 0001 | 500 |

| YEAR-MONTH-DAY | TIME SLOT | PHOTOVOLTAIC POWER GENERATION SYSTEM ID | POST-ESTIMATION POWER GENERATION AMOUNT | ACTUAL POWER GENERATION AMOUNT |
|---|---|---|---|---|
| 20150701 | 0630 | 0001 | 50 | 45 |
| 20150701 | 0700 | 0001 | 100 | 90 |
| 20150701 | 0730 | 0001 | 200 | 190 |
| 20150701 | 0800 | 0001 | 500 | 480 |

DEVICE FOR PREDICTING AMOUNT OF PHOTOVOLTAIC POWER GENERATION, AND METHOD FOR PREDICTING AMOUNT OF PHOTOVOLTAIC POWER GENERATION

CROSS REFERENCE TO RELATED APPLICATION

This application is a U.S. national stage application of International Patent Application No. PCT/JP2015/072548 filed on Aug. 7, 2015, the content of which is incorporated herein by reference.

TECHNICAL FIELD

The present disclosure relates to a photovoltaic power generation amount prediction device and a photovoltaic power generation amount prediction method that predict a power generation amount of a photovoltaic power generation system.

BACKGROUND ART

A photovoltaic power generation system is power generation equipment that can be relatively easily installed at home, and attracts attention as equipment that can contribute to a $CO_2$ reduction and energy saving. In addition, electricity generated by the photovoltaic power generation system cannot only be consumed in real time as power at a power generation site, but also can be sold to a distribution system, or can be stored as power and/or heat in energy saving storage equipment, and used at a time different from the power generation. For example, the photovoltaic power generation system can be combined with night time electric power utilization equipment that stores hot water in a heat pump hot water supplier in the night when an electric bill unit price is low and prepares for hot water supply demand in the morning and in the evening. For example, electric power generated by the photovoltaic power generation system in the daytime and/or surplus electric power that is generated power amount minus captive consumption amount can be used to increase a hot water storage amount or raise the temperature of the hot water. Thus, a hot water amount stored for night time use can be reduced or reheating prior to demand in the evening can be reduced. In such a case, the power generation amount in the daytime is required to be accurately predicted to plan to store sufficient heat for the hot water supply demand.

The surplus electric power generated by the photovoltaic power generation system may be sold to a distribution system (a reverse flow). However, as the photovoltaic power generation system cannot control the power generation amount and power generation hours, management of distribution voltages is difficult if many photovoltaic power generation systems are connected to the distribution system. Therefore, suppression of output of the photovoltaic power generation systems is investigated by electric power companies. Also in this case, accurate prediction of the power generation amount and the surplus amount of the photovoltaic power generation system are required to determine whether to issue an order to suppress output and to determine the amount of suppression.

In a conventional power generation amount prediction method, the power generation amount is predicted by predicting a solar radiation amount in a specific time slot in a specific area in which a panel of the photovoltaic power generation system is installed, and by multiplying the solar radiation amount by coefficients of a rated output and a conversion efficiency of the panel, and a conversion efficiency of a module for each temperature (for example, Non-Patent Literature 1).

In addition, there is a method for predicting a solar radiation amount irradiated on the panel by using panel information such as an azimuth, an angle of inclination, the rating, and the like of the panel of the photovoltaic power generation system, and for estimating the power generation amount by multiplying the solar radiation amount by coefficients of the power generation efficiency of the panel, a panel area and the like (for example, Patent Literature 1).

Furthermore, there is a method for predicting the power generation amount in which a power generation amount prediction formula is derived based on meteorologic phenomena observed in the past in a photovoltaic power generation system installation area and an actual power generation amount measured in the past, and a weather forecast of a prediction target day or a prediction target time slot and a power generation amount of the photovoltaic power generation system measured before a prediction execution time of a prediction target day are input in the power generation amount prediction formula (for example, Patent Literature 2).

PATENT LITERATURE

Patent Literature 1: Unexamined Japanese Patent Application Kokai Publication No. 2011-163973
Patent Literature 2: Unexamined Japanese Patent Application Kokai Publication No. 2006-33908

NON PATENT LITERATURE

Non Patent Literature 1: Naoto Ishibashi, Tatsuya Iizaka, and Toni Katsuno: "Photovoltaic Power Generation Forecasting Technology for Supporting Energy Management Systems", Fuji Electric Co., Ltd., Technical Report, Vol. 86, No. 3 (2013)

In power generation amount prediction methods such as described in Patent Literature 1 and Non-Patent Literature 1, information such as efficiency of a panel of a photovoltaic power generation system, azimuth and inclination angles of the installation site of the panel, and the like is required. Owners of domestic photovoltaic power generation systems often do not grasp panel information, and obtaining such information is difficult.

In a power generation amount prediction method as described in Patent Literature 2, as the power generation amount is predicted based on past meteorologic phenomena and an actually measured power generation amount, an input of detailed panel information is not required. However, the weather phenomenon and the power generation amount are seldom observed at the same location. When there is a local weather change at a location of the meteorologic phenomena observation or at a location of the measured power generation amount, the relationship between the meteorologic phenomena and the power generation amount becomes singular. The prediction accuracy may be decreased when prediction is performed based on such a singular relationship. In addition, when the power generation amount changes in association with gradually changing phenomena like seasonal changes, the reaction to the change becomes slow if the prediction is performed with reference to only the most recent past phenomenon.

SUMMARY

The present disclosure is achieved to solve the above-mentioned problems, and an objective of the present disclosure is to be capable of deriving a power generation amount prediction formula without detailed information regarding the panel of the photovoltaic power generation system and the panel installation site.

A photovoltaic power generation amount prediction device according to the present disclosure comprises:

an actual power generation amount acquirer to acquire an actual power generation amount of a photovoltaic power generation system of each time slot of each day;

an extraterrestrial solar radiation calculator to calculate an extraterrestrial solar radiation of each time slot of each day at a disposition position of the photovoltaic power generation system;

a weather information acquirer to acquire an actual weather record of each time slot of each day of an area including the disposition position of the photovoltaic power generation system;

a similar date extractor to classify a time slot which is the same as a prediction target time slot of each day as a similar time slot for each actual weather record type of the time slot; and a prediction formula deriver to derive a power generation amount prediction formula for calculating a predicted power generation amount of the photovoltaic power generation system from an extraterrestrial solar radiation of the prediction target time slot among the actual weather record types based on the actual power generation amount and the extraterrestrial solar radiation of the similar time slot of the actual weather record type.

The present disclosure can derive a power generation amount prediction formula for calculating predicted power generation amount from an extraterrestrial solar radiation with approximate installation site information of a photovoltaic power generation system, a past actual weather record and an actual power generation amount, without detailed information regarding a panel or a panel installation site.

BRIEF DESCRIPTION OF DRAWINGS

FIG. 2 is a table illustrating an example of an actual power generation amount stored in an actual power generation amount memory in Embodiment 1;

FIG. 3 is a table illustrating an example of an actual weather record stored in an actual weather record memory in Embodiment 1;

FIG. 10 is a table illustrating an example of an association between a group ID and photovoltaic power generation system IDs in Embodiment 2;

FIG. 11 is a table illustrating an example of a prediction formula stored in a prediction formula memory in Embodiment 2;

DETAILED DESCRIPTION

Embodiment 1

Figure 1:
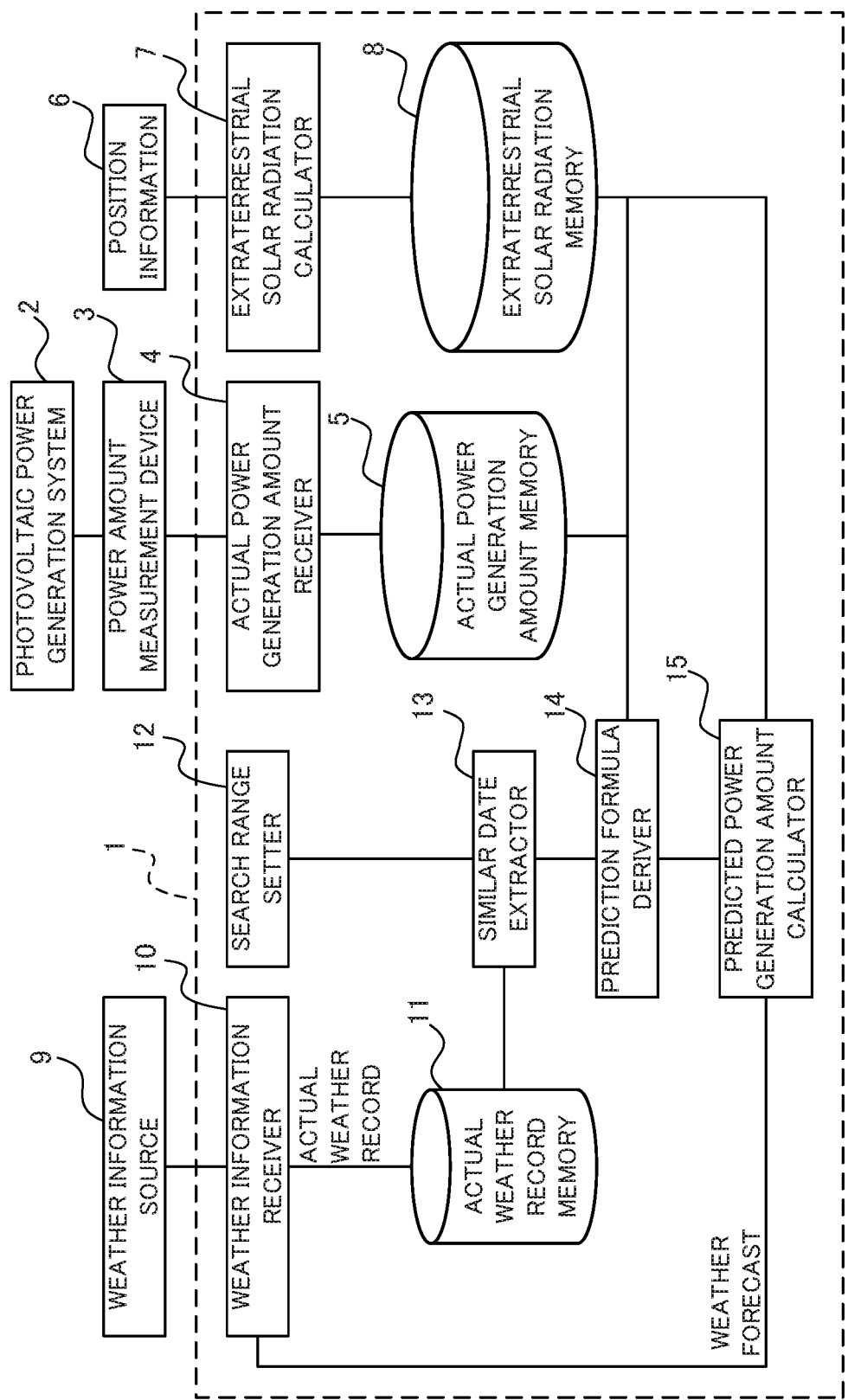
FIG. 1 is a block diagram illustrating a configuration example of a photovoltaic power generation amount prediction device according to Embodiment 1 of the present disclosure.

FIG. 1 is a block diagram illustrating a configuration example of a photovoltaic power generation amount prediction device according to Embodiment 1 of the present disclosure. A photovoltaic power generation amount prediction device 1 is connected to a weather information source 9 and a power amount measurement device 3 that measures an electric power amount generated by a photovoltaic power generation system 2. The weather information source 9, for example, is a weather information offering server of the Japan Meteorological Agency. In addition, position information 6 of a location in which the photovoltaic power generation system 2 is installed is given to the photovoltaic power generation amount prediction device 1. The photovoltaic power generation amount prediction device 1 includes an actual power generation amount receiver 4, an actual power generation amount memory 5, an extraterrestrial solar radiation calculator 7, an extraterrestrial solar radiation memory 8, a weather information receiver 10, an actual weather record memory 11, a search range setter 12, a similar date extractor 13, a prediction formula deriver 14 and a predicted power generation amount calculator 15. Hereinafter, the photovoltaic power generation amount prediction device 1 may be abbreviated as a prediction device 1.

The photovoltaic power generation amount prediction device 1 receives from the power amount measurement device 3 an actual power generation amount of each time slot generated by the photovoltaic power generation system 2. The prediction device 1 receives from the weather information source 9 a future weather forecast of each time slot and a past actual weather record of each time slot, of an area including the disposition location of the photovoltaic power generation system 2. The weather information source 9 may be a private weather information offering service, or a device in which a weather forecaster inputs weather data, other than a weather information offering server of the Japan Meteorological Agency. The position information 6 is, for example, latitude and longitude acquired from the address in which the photovoltaic power generation system 2 is installed. The position information 6 may be pre-set in the prediction device 1.

The prediction device 1 derives power generation amount prediction formulae of the photovoltaic power generation system 2 of each time slot for each actual weather record type from an extraterrestrial solar radiation of a disposition location of the photovoltaic power generation system 2 calculated using the position information 6, the actual power generation amount of the photovoltaic power generation system 2 of each time slot, and the actual weather record of each time slot. The power generation amount prediction formula is a formula for calculating a predicted power generation amount of the photovoltaic power generation system 2 from the extraterrestrial solar radiation. The predicted power generation amount of the time slot is calculated by inputting an extraterrestrial solar radiation of a prediction target time slot in the power generation amount prediction formula corresponding to an actual weather record type which is the same as the weather forecast type of the prediction target time slot. Hereinafter, functions of the photovoltaic power generation amount prediction device 1 are described in detail.

The actual power generation amount receiver 4 receives the actual power generation amount of the photovoltaic power generation system 2 of each time slot of each day from the power amount measurement device 3 such as a smart meter that measures the power generation amount of the photovoltaic power generation system 2 for each predetermined time slot. The actual power generation amount memory 5 stores the actual power generation amounts received by the actual power generation amount receiver 4 of each time slot of each day. The extraterrestrial solar radiation calculator 7 calculates the extraterrestrial solar radiations of each time slot of each day of the disposition location of the photovoltaic power generation system 2 based on the position information 6 of the photovoltaic power generation system 2. The extraterrestrial solar radiation memory 8 stores the extraterrestrial solar radiation of each time slot of each day in which the extraterrestrial solar radiations are calculated. The position information 6 of the disposition location of the photovoltaic power generation system 2 can be acquired from the address of the disposition location as a latitude and a longitude. The position information 6 can also be acquired from a global positioning system (GPS) terminal installed in the photovoltaic power generation system 2. Alternatively, the position information 6 may not be an accurate latitude and longitude of the photovoltaic power generation system 2, but may be, for example, a location representing the city, ward, district, village and/or the like where the photovoltaic power generation system 2 is installed, for example, a latitude and a longitude acquired from the location of government buildings thereof. The weather information receiver 10 receives from the weather information source 9 the future weather forecast of each time slot of each day and the actual weather record of each time slot of each day in the past of the area including the disposition location of the photovoltaic power generation system 2. The actual weather record memory 11 stores the actual weather record of each time slot of each day in which the actual weather record is received by the weather information receiver 10.

The search range setter 12 sets a past record range for referring to derive the power generation amount prediction formula. The similar date extractor 13 classifies the actual weather record of each time slot of each day stored in the actual weather record memory 11 for each actual weather record type for each time slot. The prediction formula deriver 14 derives the power generation amount prediction formula that is a relational expression between the extraterrestrial solar radiations and the actual power generation amount of each actual weather record type of each time slot, from the actual weather record of each time slot of each day classified in the similar date extractor 13.

The predicted power generation amount calculator 15 calculates the predicted power generation amount by acquiring the weather forecast and the extraterrestrial solar radiation of each prediction target time slot of a prediction target day, and by inputting the extraterrestrial solar radiation of the prediction target time slot in the power generation amount prediction formula that corresponds to the actual weather record type which is the same as the weather forecast type of the prediction target time slot. The prediction device 1 outputs the predicted power generation amount to a device or a display device that plans and controls an operation of equipment based on the predicted power generation amount.

Arrangement of such a configuration can derive the power generation amount prediction formulae of each actual weather record type with approximate disposition position information of the photovoltaic power generation system 2 and the actual weather record and the actual power generation amount of each time slot of each day in the past even without detailed information regarding the panel and the panel disposition position. The predicted power generation amount of the photovoltaic power generation system 2 of the time slot can be calculated by inputting the extraterrestrial solar radiation of the prediction target time slot in the power generation amount prediction formula that corresponds to the actual weather record type that is the same as the weather forecast type of the prediction target time slot.

The actual power generation amount memory 5, the extraterrestrial solar radiation memory 8, and the actual weather record memory 11 of the photovoltaic power generation amount prediction device 1, for example, are included in a storage device such as a semiconductor memory, a hard disk drive or the like. The actual power generation amount receiver 4 and the weather information receiver 10 collect each piece of information of each time slot of each day from the Internet, a leased circuit, short-range wireless communication, and/or a weather information provider such as the Japan Meteorological Agency, or by measuring weather data from a separately installed precipitation sensor or solar radiation amount sensor and performing a weather forecast. The actual power generation amount receiver 4, the extraterrestrial solar radiation calculator 7, the weather information receiver 10, the search range setter 12, the similar date extractor 13, the prediction formula deriver 14 and the predicted power generation amount calculator 15 are achieved by a processor, such as a central processing unit (CPU) included, for example, in a system large scale integration (LSI) chip and/or the like, executing a program stored in a storage device as functions of the processor. The prediction formula deriver 14 and the like may not be limited to this configuration, and for example, multiple processors may cooperate to achieve the prediction formula deriver 14. Alternatively, instead of the prediction formula deriver 14 that operates in accordance with a software program, and the operations may be achieved by a signal processing circuit that achieves the operations using an electric circuit as hardware. This similarly applies to the actual power generation amount receiver 4, the extraterrestrial solar radiation calculator 7, the weather information receiver 10, the search range setter 12, the similar date extractor 13, and the predicted power generation amount calculator 15. In addition, rather than using the same device to achieve the processing portion such as the prediction formula deriver 14, for example, processes up to the prediction formula deriver 14 may be achieved by a server on a cloud and the predicted power generation amount calculator 15 may be achieved by a terminal connected to the cloud.

FIG. 2 is a table illustrating an example of actual power generation amounts stored in the actual power generation amount memory in Embodiment 1. An actual power generation amount includes a year-month-day field 21, a time slot field 22, a photovoltaic power generation system ID field 23 and a power generation amount field 24. The photovoltaic power generation system ID is a unique identification code such as a numerical value or a character string attached to each photovoltaic power generation system 2, and a contract number of an electric power company may be used therefor. The actual power generation amount is stored as the power generation amount of the time slot by storing a difference between a meter reading read from a watt-hour meter at a certain period and a meter reading at the previous time of collection. Means to measure the actual power generation amount may be an electric power amount sensor that may be a device that can measure and calculate electric power amounts at a constant period. The constant period is 15 minutes, 30 minutes, one hour or the like. Here, the constant period is assumed to be 30 minutes for the following description. This constant period is a unit of prediction.

Time slots are expressed by 4 numerical digits, with divisions between time slots in each hour at 0 minutes and 30 minutes, so that 00:00 to 00:30 is designated as the "0000" time slot, and 00:30 to 01:00 is designated as the "0030" time slot. For example, regarding the photovoltaic power generation system 2 whose photovoltaic power generation system ID is "0001", a meter reading at 7:00 on July first, 2015, is assumed to be "1000 Wh", and a meter reading at 7:30 on July first, 2015, is assumed to be "1100 Wh", the power generation amount of 0700 time slot can be calculated as 1100−1000=100 Wh. Therefore, in this case, "20150701" is stored in the year-month-day field 21, "0700" is stored in the time slot field 22, "0001" is stored in photovoltaic power generation system ID field 23, and "100" is stored in the power generation amount field 24 respectively.

By the way, the time slot between exceeding 00:00 and 00:30 may be expressed as "0030" time slot, and the time slot between exceeding 00:30 and 01:00 may be expressed as "0100" time slot. The time slots may be expressed in 4 numerical digits of the end of the time slot. In addition, if the collection time is late and collected at 00:31 for example, a proportional allotment is performed to an actual power generation amount collected before or after the regular collection time, the actual power generation amount of the late correction is corrected to 0030, that is, the actual power generation amount of a prescribed period. In addition, for example, for the photovoltaic power generation system 2 whose power generation amount can only be measured at every hour, each half of the measured power generation amount may be set as actual power generation amounts for each 30 minutes.

The extraterrestrial solar radiation calculator 7 acquires the position (latitude, longitude) where the photovoltaic power generation system 2 is installed, and calculates the extraterrestrial solar radiation. The extraterrestrial solar radiation calculator 7 may calculate the extraterrestrial solar radiation of a time slot referred to by the prediction formula deriver 14 each time the prediction formula deriver 14 refers to the time slot. In that case, the extraterrestrial solar radiation memory 8 may not be required. In Japan, it is known that the extraterrestrial solar radiation Q can be calculated from formula (1) using a month, a date, a time of the day, a latitude (North) $\phi_0$, and a longitude (East) $\lambda_0$. Here, DN is a number of days passed from January 1 to a target day for calculating the extraterrestrial solar radiation. The target time is HH o'clock MM minutes in Japan Standard Time (JST). In addition, $\theta_0$ is a parameter, $\delta$ is a solar declination of a prediction target day, r is the distance between the Sun and the earth's center, Eq is the equation of time, h is an hour angle of the Sun at HH o'clock MM minutes.

$\varphi$ [rad]=$\varphi_0$ [degrees]×$\pi$/180

$\lambda$ [rad]=$\lambda_0$ [degrees]×$\pi$/180

$\theta_0$ [rad]=$2\pi(DN$ [days]−1)/365 [days]

$\delta$ [rad]=0.006918−0.399912 cos($\theta_0$)+0.070257 sin($\theta_0$)−0.006758 cos($2\theta_0$)]+0.0009075 in($2\theta_0$)−0.002697 cos($3\theta_0$)+0.001480 sin($3\theta_0$)

$r$[astronomical unit]=1/{1.000110+0.034221 cos($\theta_0$)+0.001280 sin($\theta_0$)+0.000719 cos($2\theta_0$)+0.000077 sin($2\theta_0$)}$^{0.5}$ $Eq$ [rad]=0.000075+0.001868 cos($\theta_0$)−0.032077 sin($\theta_0$)−0.014615 cos($2\theta_0$)−0.040849 sin($2\theta_0$)

JST [hour]=$HH$ (hour)+$MM$ (minute)/60

$h$ [rad]=(JST-12)$\pi$/12+($\lambda$−135$\pi$/180)+$Eq$ $\alpha$ [rad]=arcsin{sin($\varphi$)sin($\delta$)+cos($\varphi$)cos($\delta$)cos($h$)}

$$Q \text{ [W/m}^2\text{]}=1367 \text{ [W/m}^2\text{]}\times(1/r)^2\times\sin(\alpha) \quad (1)$$

FIG. 3 is a table illustrating an example of the actual weather record stored in the actual weather record memory in Embodiment 1. The actual weather record includes a year-month-day field 31, a time slot field 32, an area ID field 33 and a weather field 34. The area ID field is a unique identification code such as a numerical value or a character string assigned to each meteorological observation location, and associated with the photovoltaic power generation system ID by an area ID versus photovoltaic power generation system ID correspondence table that is not illustrated. Multiple photovoltaic power generation system IDs are sometimes associated with one area ID. The actual weather record received from the weather information source 9 such as the Japan Meteorological Agency is stored in the weather field 34. The weather types are, for example, weather types of "fine", "cloudy", "rain", and "snow". When pieces of information such as precipitation, daylight hours, and the like are provided from the weather information source 9, the pieces of information are converted to the weather types and are stored, using conversion rules such as for example, when a snow depth is 1 mm or more and the difference from the previous time slot is 1 mm or more, the weather type is "snow", when the precipitation is 1 mm or more, the weather type is "rain", when the weather type is not "rain" and the daylight hours are more than 70% of the time slot, the weather type is "fine". The weather types may not be a character string such as "fine", but may be a nominal scale such as "0" for a fine weather and "1" for a cloudy weather, or may be a numerical value or an interval scale such as a ratio of the daylight hours to the length of the time slot and/or the like. When precipitation is measured in 1-hour units, the precipitation is converted to precipitation per time slot by a method such as assigning ½ of the precipitation to each of the time slots. For example, when precipitation from 7:00 to 8:00 is observed to be 20 mm, precipitation of 0700 time slot is assumed to be 20/2=10 mm, precipitation of 0730 time slot is assumed to be 20−10=10 mm.

Figure 4:
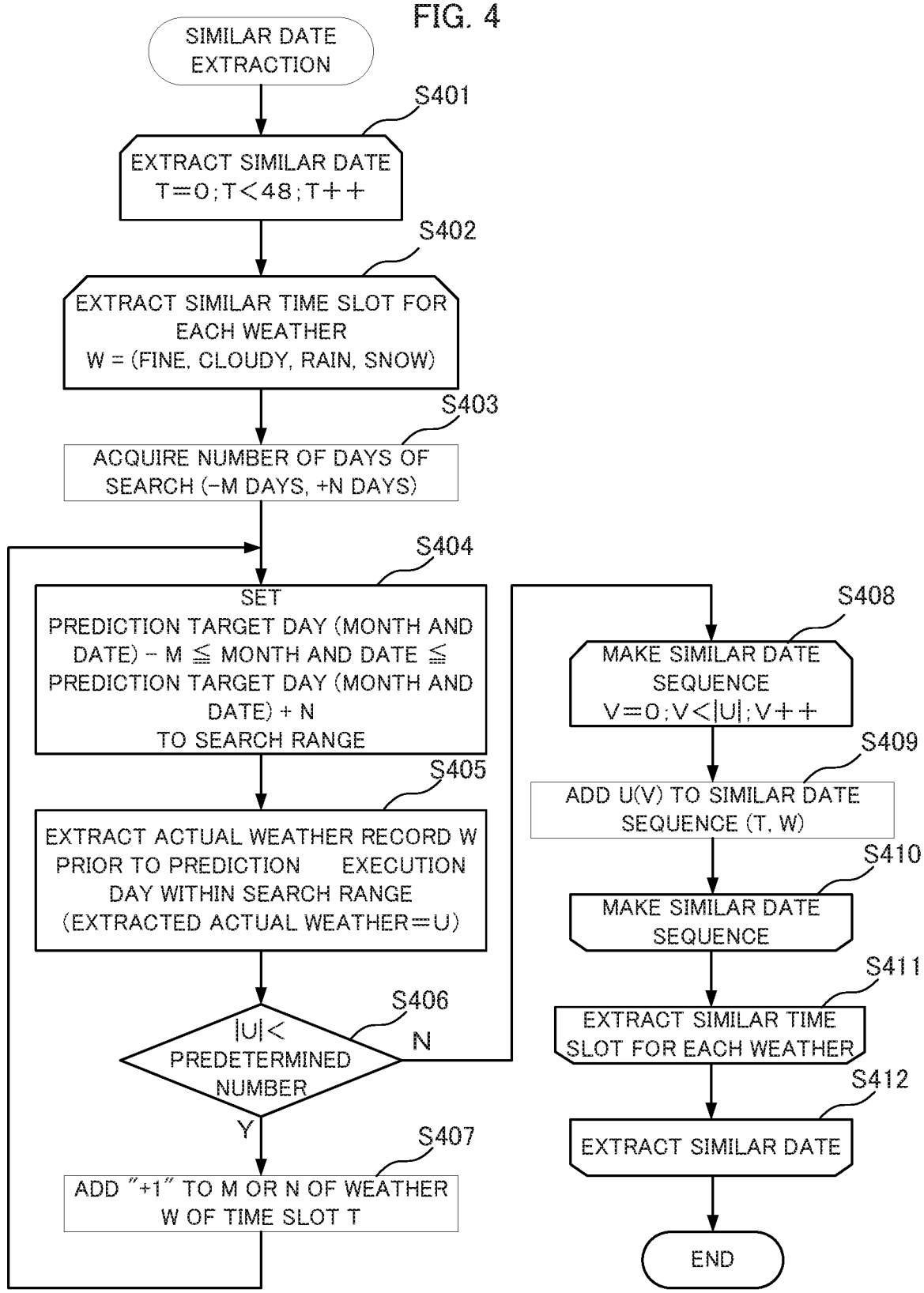
FIG. 4 is flow chart illustrating an example of a process of a similar day extraction in Embodiment 1.

The photovoltaic power generation amount prediction device 1 performs the below processing for each photovoltaic power generation system ID. The search range setter 12 sets a range for searching the actual weather record of each time slot that is referred to for deriving the power generation amount prediction formula. The similar date extractor 13 classifies the actual weather records of each time slot of each day stored in the actual weather record memory 11 into similar time slots of each actual weather record type, for a weather of an area ID corresponding to a photovoltaic power generation system ID of the prediction target. FIG. 4 is a flow chart illustrating an example of the process of the similar date extraction in Embodiment 1. Steps S401 through S412 form loop processing to extract similar dates for each time slot T. The number of time slots is 48 when a similar date is extracted for all time slots of one prediction target day, the time slots being assumed to be 30 minutes. Steps S402 through S411 form loop processing to extract a similar time slot for each actual weather type (weather) for each time slot T (0-47). In step S403, an initial value of a number of search days (−M day, +N day) is acquired, and the number of search days of the time slot T and the weather type (weather) W is set. A value of 0 or more is assumed to be set to the initial value of the number of search days beforehand. In step S404, dates of a range from the prediction target date minus M days and plus N days are calculated. Actually, the initial value M is set such that the latest day when the actual power generation amount of the target photovoltaic power generation system 2 is acquired is included.

Figure 5:
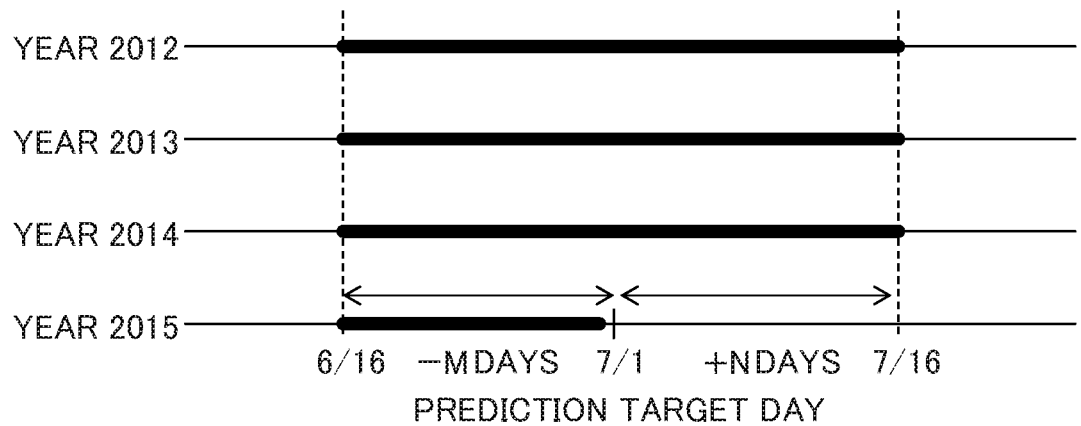
FIG. 5 is a drawing illustrating an example of a search range set by a search range setter in Embodiment 1.

FIG. 5 is a drawing illustrating an example of a search range set by the search range setter in Embodiment 1. FIG. 5 illustrates a case in which the actual weather records and the actual power generation amounts are stored from the year 2012, and illustrates an example in which a power generation amount on Jul. 1, 2015, is predicted by assuming M=15, and N=15. A prediction execution day is, for example, Jun. 30, 2015. An actual power generation amount up to a prediction execution time of the prediction execution day is assumed to be acquired. In this case, in step S404 of FIG. 4, a range from 15 days before the prediction target day to 15 days after the prediction target day, that is, from June 16 to July 16 is set as a search range.

In step S405, actual weather records before the prediction target day within the search range are extracted. In the example of FIG. 5, days having the same actual weather record type are extracted for each actual weather record type for each time slot T in the period before Jul. 1, 2015 in which actual weather records and actual power generation amounts are collected, that is, in search ranges from Jun. 16, 2012 to Jul. 16, 2012, from Jun. 16, 2013 to Jul. 16, 2013, from Jun. 16, 2014 to Jul. 16, 2014, and from Jun. 16, 2015 to Jun. 30, 2015. Here, a sequence of the extracted actual records is assumed to be U. The time at which a high building forms a shadow sometimes changes with changes of seasons. When only the prediction target day minus M days is set as the past record range excluding ranges in past years, the power generation amount prediction formula is created based on actual records of days in which the time at which the shadow of the high building forms is earlier or later than that of the prediction target day. Thus, a time difference in which the power generation amount decreases due to formation of the shadow arises in the time slot. On the other hand, the power generation amount prediction formula can be created based on an actual record including the day in which the time at which the shadow of the high building forms is earlier and the day in which the time at which the shadow of the high building forms is late by setting the range of dates to the number of searching days and acquiring a similar date in the search range including ranges before and after the prediction target day in the past years. As the result, the time slot in which the power generation amount decreases is offset, and an appropriate prediction corresponding to periodic changes such as the changes of seasons can be performed. Although the search range is determined as described above, a configuration may be used in which the period during which the actual power generation records are acquired is preliminarily set.

In step S406 of FIG. 4, determination is made as to whether |U|, which is the number of elements of U, is more than a predetermined number. If |U| is less than the predetermined number (YES in step S406), 1 is added to at least one of M or N (step S407). For example, there is a problem of reducing the reliability of the power generation amount prediction formula made in the prediction formula driver 14 when no similar date is extracted in the similar date extractor 13 or the number of similar dates are very few if peculiar weather is observed such as snow accumulating in the Kansai (western Japan) area in November. Large initial values of M and/or N would hardly cause such a problem. However, if the values are too large, a prediction in midsummer would be made using an actual record of spring. Therefore, the reliability of the power generation amount prediction formula is decreased. In order to solve such a problem, processing is performed that gradually increases the value of M or N little by little and widens the search range. If the number of U elements |U| becomes the predetermined number or more (No in step S406), each element U (V) of U is added to the corresponding similar date sequence (T, W), and the similar date sequence is created (steps S408 through, S409, S410).

The similar date extractor 13 repeats steps S403 through S410 for each actual weather record type (weather), and acquires the similar date sequence of the time slot T of each weather type W. The steps S402 through S411 are repeated with the time slot T being changed from 0 to 47, and the similar date sequence (T, W) is acquired for all time slots of the whole prediction target day.

Figure 6:
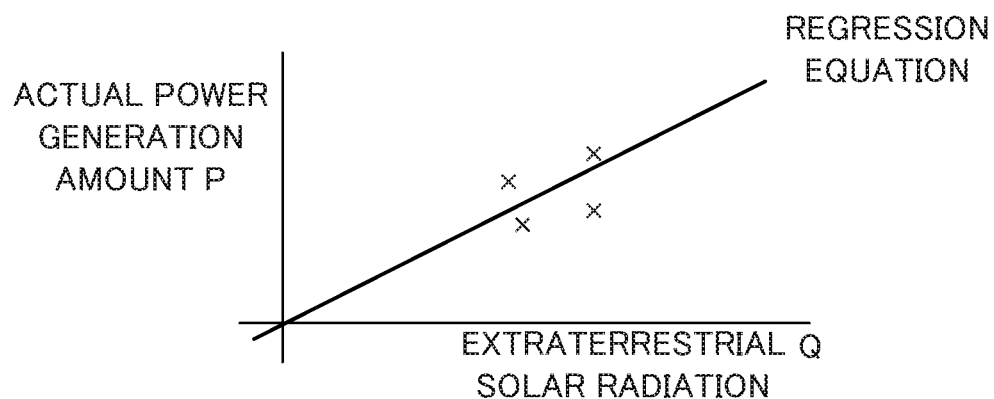
FIG. 6 is a conceptual drawing of a power generation amount prediction formula derived by a prediction formula deriver in Embodiment 1.

The prediction formula deriver 14 of FIG. 1 performs regression analyses of the extraterrestrial solar radiation and the actual power generation amount of each actual weather record type for each time slot with respect to the similar date sequence (T, W) extracted by the similar date extractor 13, and derives relational expressions of the extraterrestrial solar radiation and the actual power generation amount of each actual weather record type for each time slot as power generation amount prediction formulae. FIG. 6 is a conceptual drawing of the power generation amount prediction formula derived by a prediction formula deriver in Embodiment 1. For example, if 4 actual records of "fine" weather of the time slot 1000 (from 10:00 to 10:30) are extracted, as illustrated in FIG. 6, a regression equation P=aQ+b is acquired by a regression analysis using the least square method in which the extraterrestrial solar radiation Q is taken to be an explanatory variable and the actual power generation amount P taken to be a target variable. FIG. 6 shows an example of a linear regression in which an intercept b=0. Alternatively, b may have a non-zero value, and a method such as logistic regression may be used rather than linear regression. In place of the actual power generation amount, the target variable may be an index such as a power generation amount per unit rating that is the power generation amount divided by the rated output of the photovoltaic power generation system 2.

Regarding the regression analysis, the regression equation P=aQ+b may be acquired using the weighted least square method by increasing the weight as the number of days difference from the prediction target day is smaller, as the prediction target day is closer to the regression analysis date, or a weather condition such as a temperature is closer. For example, when the actual storing period becomes long, a high building may be built in the middle of the storing period, and suddenly solar insolation worsens. In such a case, the regression analysis is performed using the weighted least square method by increasing the weight as the number of days difference from the prediction target day is smaller, influences given to the prediction by the past record prior to the building being built can be decreased, and power generation amount prediction responding to chronological changes can be performed.

In addition, as the difference of the extraterrestrial solar radiations of the same time slot of the close dates is very small, the power generation amount prediction formula can be derived without depending on the regression analysis of the actual power generation amount P and the extraterrestrial solar radiation Q. For example, in the above-mentioned P=aQ+b, the intercept b can be set to 0 and the coefficient a can be set to a value of an average of the actual power generation amount P of a similar date divided by an average of the extraterrestrial solar radiation Q of the similar date. Alternatively, the coefficient a and the intercept b may be calculated using a method in which the intercept b is set to 0 and the coefficient a is set to be an average of a value of the actual power generation amounts P of each similar date divided by the extraterrestrial solar radiations Q of the similar dates.

The predicted power generation amount calculator 15 acquires the extraterrestrial solar radiation Q of the prediction target time slot and the weather forecast of the prediction target time slot from the extraterrestrial solar radiation memory 8 and the weather information receiver 10 respectively, and acquires, from the prediction formula deriver 14, the electric power amount prediction formula of a prediction target photovoltaic power generation system 2 corresponding to the same actual weather record type as the weather forecast type of the prediction target time slot. The extraterrestrial solar radiation Q is inputted into the power generation amount prediction formula to calculate a power generation amount prediction result P. When the power generation amount prediction formula is expressed like the following formula (2), the predicted power generation amount calculator 15 may acquire regression coefficients a and b from the prediction formula deriver 14.

$$P=aQ+b \qquad (2)$$

Process timing of each component is described. As the extraterrestrial solar radiation is determined by a latitude, a longitude, and a date and time of the day, the extraterrestrial solar radiation calculator 7 can calculate the extraterrestrial solar radiation of each time slot in a year at the time when the photovoltaic power generation system 2 is introduced. The actual power generation amount receiver 4 is processed at a fixed cycle period such as every hour on the hour or on the half hour. The weather information receiver 10 receives the weather information at the timing when the weather information source 9 such as the Japan Meteorological Agency delivers weather information. Among pieces of weather information, the actual weather record may be acquired in single-day portions. Processes of the search range setter 12, the similar date extractor 13, and prediction formula deriver 14 predict a power generation amount of the next day once a day, for example, at 23:00. The predicted power generation amount calculator 15, similar to the search range setter 12 through the prediction formula deriver 14, is performed once a day or at the timing when the weather information receiver 10 receives the weather forecast.

In addition, the actual weather record types and the weather forecast types are not limited to four types of "fine", "cloudy", "rain", and "snow". Furthermore, the types may be classified more finely by adding such types as, for example, "partly cloudy", "cloudy sometimes sunny", "cloudy with occasional rain" and the like, or may be classified using a degree of cloudiness and/or precipitation. In addition, as long as the pieces of information correspond to one another, the time slots of actual weather records, weather forecasts, actual power generation amounts and extraterrestrial solar radiations may be at non-constant periods.

This type of configuration can derive the power generation amount prediction formula with approximate disposition position information of the photovoltaic power generation system 2 and the actual weather record and the actual power generation amount of the past, even without detailed information regarding the panel and the panel disposition position. The power generation amount of the photovoltaic power generation system 2 of the time slot can be predicted by inputting the extraterrestrial solar radiation of the prediction target time slot in the power generation amount prediction formula that corresponds to the actual weather record type that is the same as the weather forecast type of the prediction target time slot.

The photovoltaic power generation amount prediction device 1 of FIG. 1 can be achieved using a server on a network to be a configuration that calculates predicted power generation amounts of multiple photovoltaic power generation systems 2 connected to the network. Alternatively, the prediction device 1 can be achieved by terminals installed for each photovoltaic power generation system 2 to form a configuration that calculates the predicted power generation amount of the photovoltaic power generation system 2. When the prediction device 1 is achieved using the server on the network, one server may function as the prediction device 1, or functions of the prediction device 1 may be distributed to multiple servers to form the prediction device 1. Furthermore, loads of one function may be distributed to multiple servers. When the prediction device 1 is achieved by one server or one terminal, the server or the one terminal is a photovoltaic power generation amount prediction device.

Figure 7:
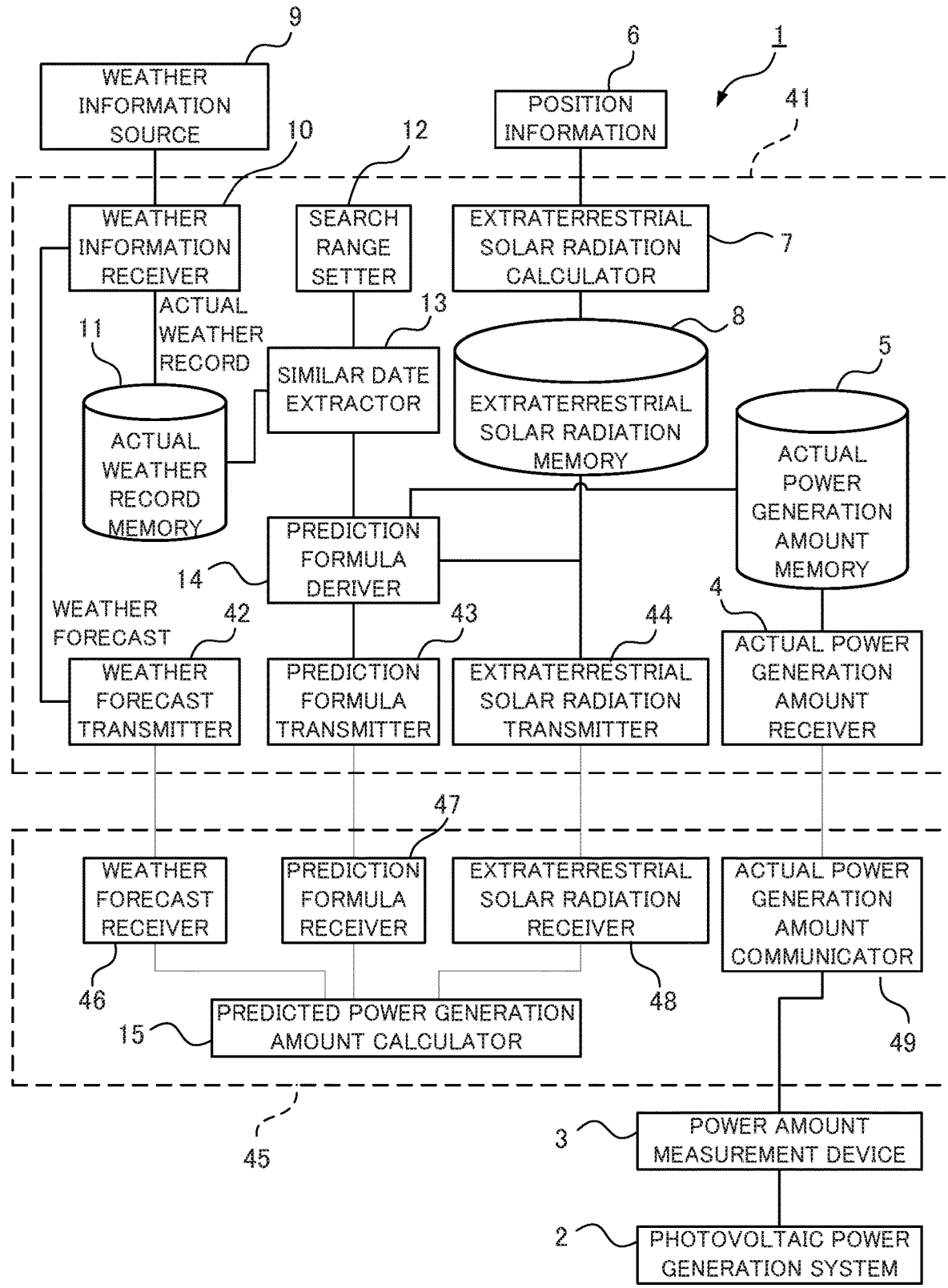
FIG. 7 is a block diagram illustrating an example in which a burden of prediction of the photovoltaic power generation amount prediction device according to Embodiment 1 is shared by a server and a terminal.

The functions of the photovoltaic power generation amount prediction device 1 can be performed in a configuration in which the functions are shared by a server and a terminal FIG. 7 is a block diagram illustrating an example in which a burden of prediction of the photovoltaic power generation amount prediction device according to Embodiment 1 is shared by a server and a terminal. In the example of FIG. 7, the prediction device 1 is formed of a server 41 and a terminal 45. There are cases in which the multiple terminals 45 are connected to the one server 41. The server 41 performs processes up to the derivation of the power generation amount prediction formula, and the terminal 45 acquires, from the server 41, the power generation amount prediction formula of the photovoltaic power generation system 2 to which the terminal is connected to calculate the predicted power generation amount. The terminal 45 is, for example, a Home Energy Management System (HEMS) terminal that manages energy at home using a home photovoltaic power generation system.

The server 41 has a configuration of the photovoltaic power generation amount prediction device 1 of FIG. 1, from which the predicted power generation amount calculator 15 is removed, and to which a weather forecast transmitter 42, a prediction formula transmitter 43, and an extraterrestrial solar radiation transmitter 44 are added. The terminal 45 includes the predicted power generation amount calculator 15, a weather forecast receiver 46, a prediction formula receiver 47, an extraterrestrial solar radiation receiver 48 and an actual power generation amount communicator 49. The predicted power generation amount calculator 15 of the terminal 45 is the same as the predicted power generation amount calculator 15 of the prediction device 1 of FIG. 1.

The actual power generation amount communicator 49 receives the actual power generation amount from the power amount measurement device 3 and transmits the actual power generation amount to the actual power generation amount receiver 4 of the server 41. The processing of the server 41 up to the prediction formula deriver 14 is the same as the processing of the prediction device 1 of FIG. 1. The server 41 transmits the weather forecast received by the weather information receiver 10 to the weather forecast receiver 46 of the terminal 45. The prediction formula transmitter 43 transmits to the prediction formula receiver 47 the power generation amount prediction formula derived by the prediction formula deriver 14 of the photovoltaic power generation system 2. The extraterrestrial solar radiation transmitter 44 transmits the extraterrestrial solar radiation of the prediction target time slot to the extraterrestrial solar radiation receiver 48.

The weather forecast receiver 46 of the terminal 45 receives the weather forecast from the weather forecast transmitter 42, the prediction formula receiver 47 receives the power generation amount prediction formula from the prediction formula transmitter 43, and the extraterrestrial solar radiation receiver 48 receives the extraterrestrial solar radiation from the extraterrestrial solar radiation transmitter 44. The predicted power generation amount calculator 15 inputs the extraterrestrial solar radiation of the prediction target time slot in the power generation amount prediction formula corresponding to the actual weather record type that is the same as the weather forecast type of the prediction target time slot, and calculates the predicted power generation amount.

Function sharing of the server 41 and the terminal 45 is not limited to the example of FIG. 7. For example, the actual power generation amount memory 5 may exist in the server 41, in the terminal 45, or both in the server 41 and in the terminal 45. The weather forecast receiver 46 may acquire the weather forecast directly from the weather information source 9. In the prediction device 1 of FIG. 7, the server 41 is the photovoltaic power generation amount prediction device. The server 41 may be formed of multiple servers distributed and installed in the network.

Figure 8:
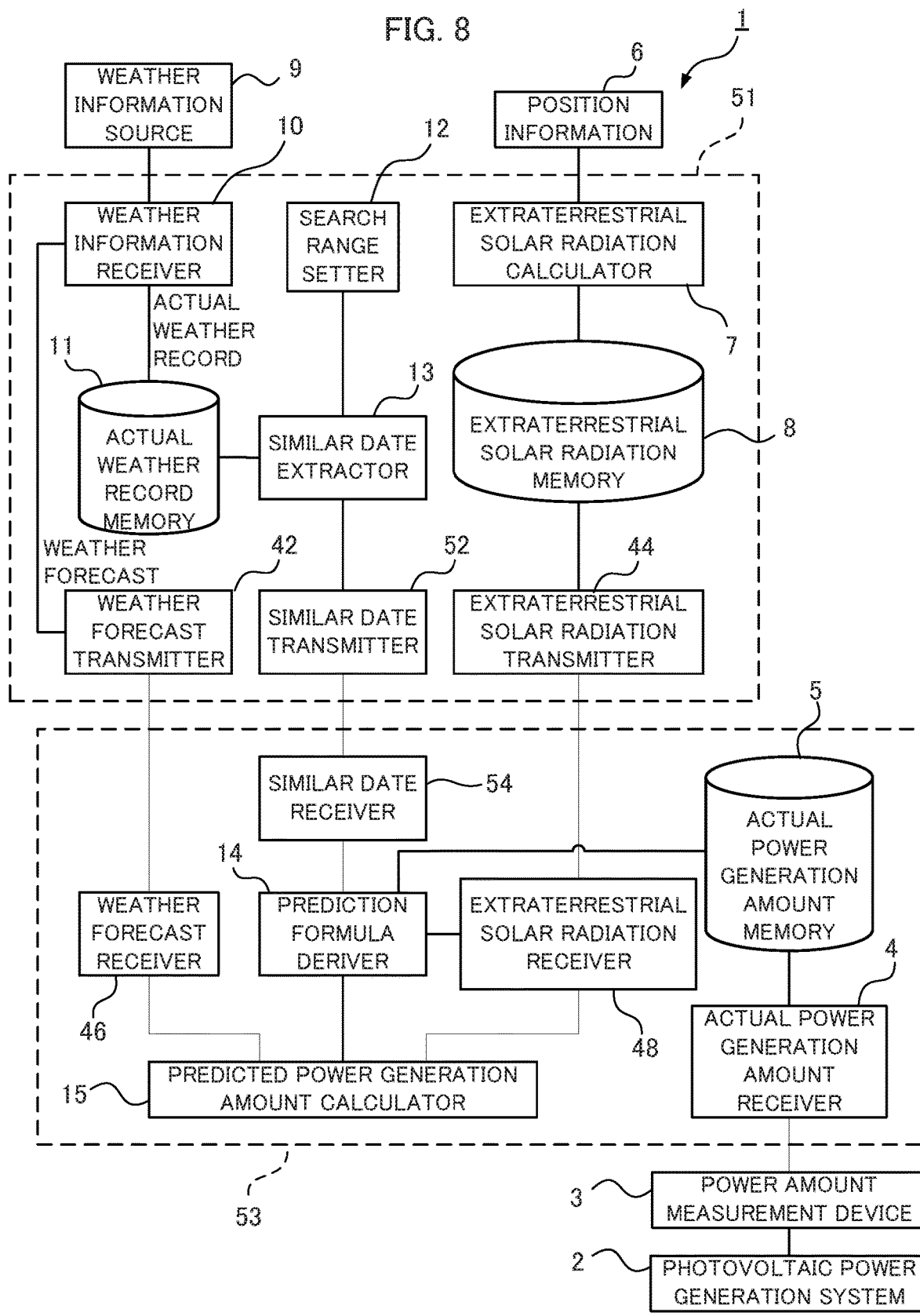
FIG. 8 is a block diagram illustrating a different example in which a burden of prediction of the photovoltaic power generation amount prediction device according to Embodiment 1 is shared by a server and a terminal.

FIG. 8 is a block diagram illustrating a different example in which a burden of prediction of the photovoltaic power generation amount prediction device according to Embodiment 1 is shared by a server and a terminal. In the example of FIG. 8, the prediction device 1 is formed of a server 51 and a terminal 53. Cases may occur in which the one server 51 is connected to multiple terminals 53. The server 51 performs processing up to the extraction of the similar date, and the terminal 53 derives the power generation amount prediction formula of the photovoltaic power generation system 2 to which the terminal 53 is connected, and calculates the predicted power generation amount.

The actual power generation amount receiver 4, the actual power generation amount memory 5, the prediction formula deriver 14 and the prediction formula transmitter 43 are removed from the server 41 of FIG. 7, and a similar date transmitter 52 in substitution is added to the server 41 to form the server 51. The weather forecast transmitter 42 and the extraterrestrial solar radiation transmitter 44 are the same as in the case of FIG. 7.

The actual power generation amount receiver 4 and the actual power generation amount memory 5 are included in the terminal 45 of FIG. 7 instead of the actual power generation amount communicator 49, and a similar date receiver 54 and the prediction formula deriver 14 are included in the terminal 45 of FIG. 7 instead of the prediction formula receiver 47 to form the terminal 53. The weather forecast receiver 46, the extraterrestrial solar radiation receiver 48 and the predicted power generation amount calculator 15 are the same as in the case of FIG. 7. The actual power generation amount receiver 4 and the actual power generation amount memory 5 are the same as in the case of FIG. 1.

The server 51 transmits the similar date sequence extracted by the similar date extractor 13 to the similar date receiver 54 of the terminal 53 from the similar date transmitter 52. The terminal 53 receives the weather forecast, the similar date sequence and the extraterrestrial solar radiation from the server 51. The prediction formula deriver 14 performs the regression analyses of the extraterrestrial solar radiation and the actual power generation amount of each actual weather record type for each time slot with respect to the similar date sequence received by the similar date receiver 54, and derives as the power generation amount prediction formulae the relational expressions of the extraterrestrial solar radiation and the actual power generation amount of each actual weather record type for each time slot. The predicted power generation amount calculator 15 inputs the extraterrestrial solar radiation of the prediction target time slot in the power generation amount prediction formula corresponding to the actual weather record type that is the same as the weather forecast type of the prediction target time slot, and calculates the predicted power generation amount.

Function sharing of the server 51 and the terminal 53 is not limited to the example of FIG. 8. For example, the terminal 53 may include the extraterrestrial solar radiation memory 8. The terminal 53 may further include the extraterrestrial solar radiation calculator 7. In addition, the weather forecast receiver 46 may acquire the weather forecast directly from the weather information source 9. In the prediction device 1 of FIG. 8, the terminal 53 is the photovoltaic power generation amount prediction device.

The weather forecast receiver 46 is a weather forecast acquirer, and the extraterrestrial solar radiation receiver 48 is an extraterrestrial solar radiation acquirer, and the similar date receiver 54 is a similar date acquirer.

In addition, in aforementioned Embodiment 1, the power generation amount prediction formulae are derived for each actual weather record type for each time slot Alternatively, only the power generation amount prediction formula of the same actual weather record as the weather forecast of the prediction target day may be derived for each time slot. In this way, a calculation amount of the power generation amount prediction formula can be reduced.

Embodiment 2

Figure 9:
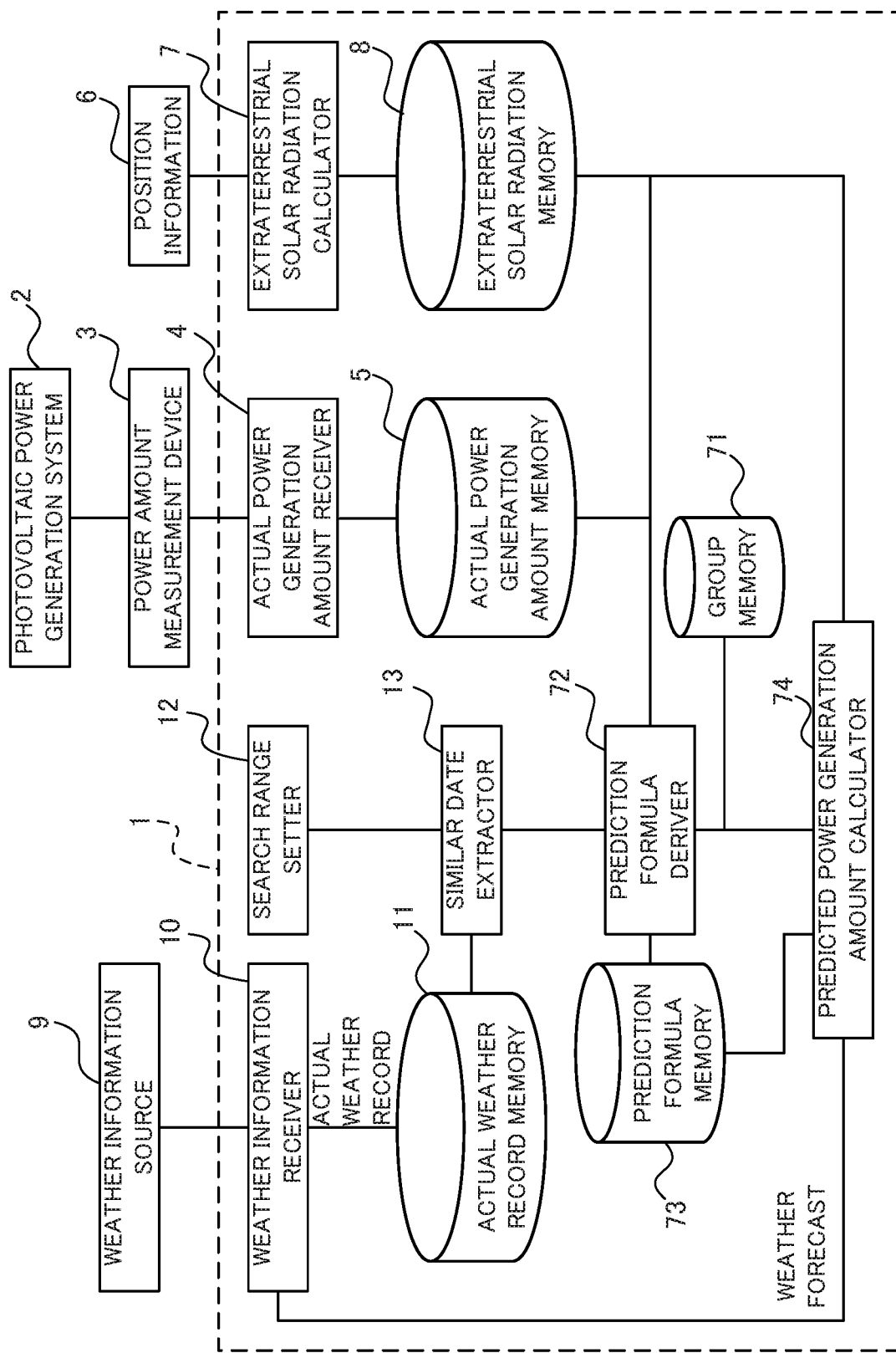
FIG. 9 is a block diagram illustrating a configuration example of a photovoltaic power generation amount prediction device according to Embodiment 2 of the present disclosure.

FIG. 9 is a block diagram illustrating a configuration example of a photovoltaic power generation amount prediction device according to Embodiment 2 of the present disclosure. A component to which the same number is assigned as in FIG. 1 is the same as that of Embodiment 1. The photovoltaic power generation amount prediction device 1 according to Embodiment 2 includes a group memory 71 and a prediction formula memory 73 in addition to the components of the configuration of Embodiment 1. A prediction formula deriver 72 derives the power generation amount prediction formula for one photovoltaic power generation system 2 representing a group for each group. For the photovoltaic power generation system 2 not representing the group, a predicted power generation amount calculator 74 uses the power generation amount prediction formula of the representative of the group to which the photovoltaic power generation system 2 belongs to calculate the predicted power generation amount.

When the power generation amounts of multiple photovoltaic power generation systems 2 are collectively managed using a cloud system and/or the like and the power generation amounts are predicted, if the number of the photovoltaic power generation system 2 increases, a problem occurs in which, when power generation amount predictions are frequently performed, increases of numbers of the processes and servers lead to cost increase for each photovoltaic power generation system 2. Such a problem can be solved by standardizing the power generation amount prediction formula for the multiple photovoltaic power generation systems 2.

In the prediction device 1 of Embodiment 2, the photovoltaic power generation systems 2 are classified into, for example, a group of the photovoltaic power generation systems 2 whose geographical distances are close to each other and a group of those having similar trends of the actual power generation amounts. Having similar trends of the actual power generation amounts means that, for example, a number of local maxima of the actual power generation amounts and time slots of the local maxima in a day are the same and a ratio of a maximum value and a minimum value is within a determined range. In addition, a group of the photovoltaic power generation systems 2 is made that has similar trends of the actual power generation amounts throughout a year.

FIG. 10 is a table illustrating an example of an association between a group ID and the photovoltaic power generation system IDs in Embodiment 2. The group ID is a code identifying a group. The relationship between the group ID and the photovoltaic power generation system ID is 1 versus n (n≥1) correspondence. In addition to the group ID, an area ID of each meteorological observation spot may be assigned. The area ID is associated with the group ID by an area ID versus group ID correspondence table that is not illustrated. In some cases, which multiple group IDs are associated with one area ID. When the trend is changed due to, for example, an increase of the photovoltaic power generation system 2, the group classification may be changed from the group to which the photovoltaic power generation system 2 belongs to another group.

Taking the determined photovoltaic power generation system 2 representing each group to be a representative system, the prediction formula deriver 72 extracts the actual power generation amount of the representative system from the actual power generation amount memory 5 to derive the prediction formula. The prediction formula deriver 72 associates the derived prediction formula with the group ID, and stores the prediction formula in the prediction formula memory 73. As a representative system, for example, the photovoltaic power generation system 2 is selected in which a sum of geographical distances from another photovoltaic power generation system 2 in the group is minimized FIG. 11 is a table illustrating an example of a prediction formula stored in a prediction formula memory in Embodiment 2. The prediction formula deriver 72 derives the prediction formula for each date, for the each time slot, for the each group ID and for each actual weather record type, and outputs the regression coefficients a and b. The prediction formula deriver 72 stores the elements of the date, the time slot, the group ID, the actual weather record type and the regression coefficients a and b for identifying the power generation amount prediction formula, in a year-month-date field 91, a time slot field 92, a group ID field 93, a weather field 94, a regression coefficient (slope a) field 95, and a regression coefficient (intercept b) field 96 respectively.

When ratings of the photovoltaic power generation system 2 belonging to the group are almost the same, the power generation amount prediction formula may be expressed in a regression line whose target variable is the actual power generation amount. When there is a difference in the ratings of the photovoltaic power generation system 2 belonging to the group, instead of taking the target variable to be the actual power generation amount, the target variable may be set to be an index such as a power generation amount per unit rating by dividing the actual power generation amount by the rated output of the representative photovoltaic power generation system 2.

The predicted power generation amount calculator 74 acquires the extraterrestrial solar radiation Q of the prediction target time slot and the weather forecast of the prediction target time slot from the extraterrestrial solar radiation memory 8 and the weather information receiver 10 respectively, and acquires an ID of a group to which the prediction target photovoltaic power generation system 2 belongs from a group ID versus photovoltaic power generation system ID correspondence table that is not illustrated. Further, the predicted power generation amount calculator 74 acquires, from the prediction formula memory 73, the regression coefficients a and b of the group ID corresponding to the actual weather record type that is the same as the weather forecast type of the prediction target time slot, inputs the extraterrestrial solar radiation of the prediction target time slot into the power generation amount prediction formula, and calculates the predicted power generation amount P. The power generation amount prediction formula is expressed in the aforementioned formula (2).

In accordance with the photovoltaic power generation amount prediction device of Embodiment 2, only one set of power generation amount prediction formulae is derived for each group of the photovoltaic power generation system 2. Thus the processing of the prediction formula derivation can be greatly reduced.

When the photovoltaic power generation amount prediction device 1 of Embodiment 2 is achieved using one server, the prediction device 1 is also the photovoltaic power generation amount prediction device. Also in Embodiment 2, similar to FIG. 7, a configuration can be employed in which the photovoltaic power generation amount prediction device 1 is shared by the server that performs processing up to the prediction formula derivation and the terminal that receives the power generation amount prediction formula and calculates the predicted power generation amount. In that case, the server is the photovoltaic power generation amount prediction device. In that case, the server can also serve as one terminal.

Embodiment 3

Figure 12:
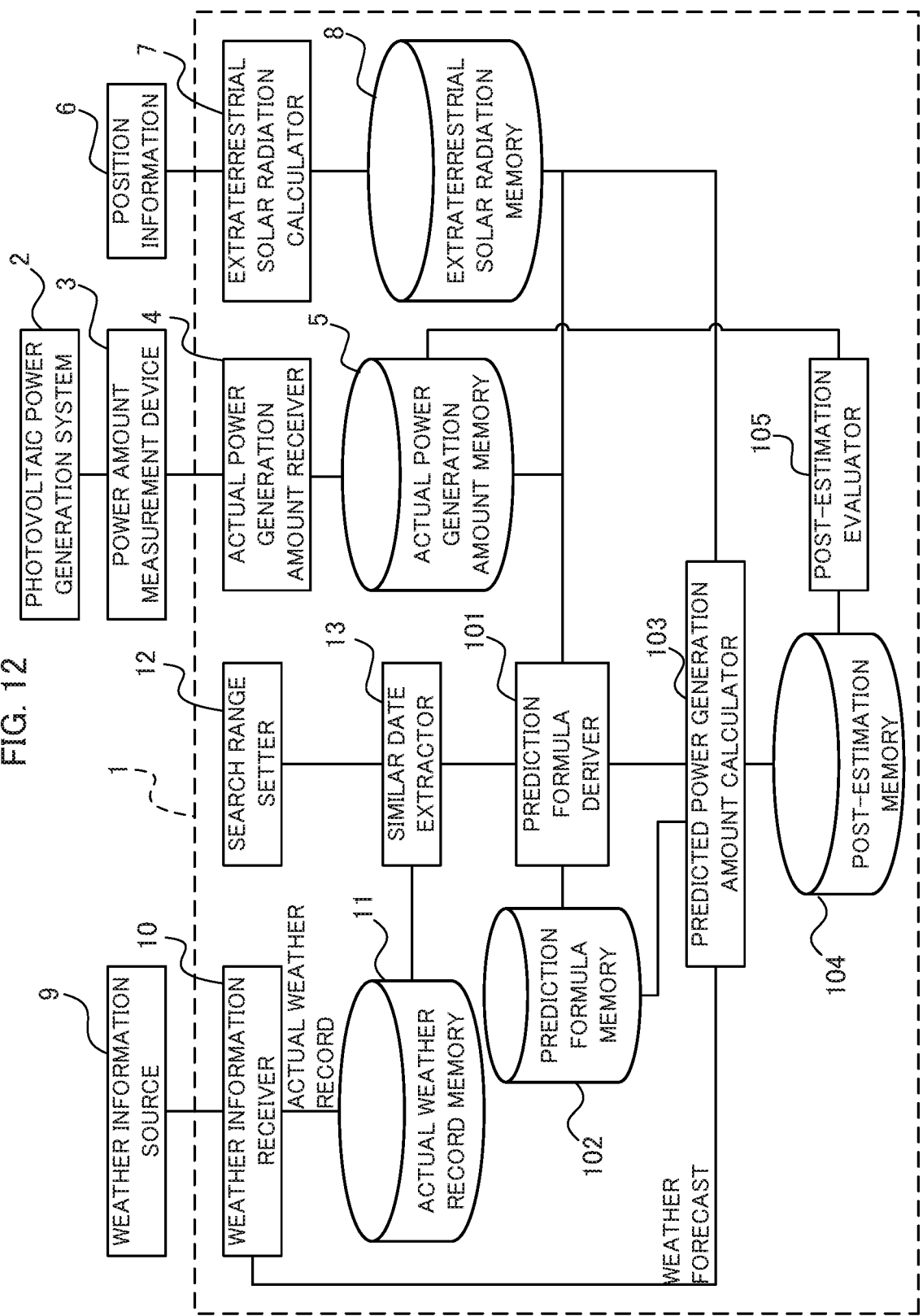
FIG. 12 is a block diagram illustrating a configuration example of a photovoltaic power generation amount prediction device according to Embodiment 3 of the present disclosure.

FIG. 12 is a block diagram illustrating a configuration example of a photovoltaic power generation amount prediction device according to Embodiment 3 of the present disclosure. A component to which the same number is assigned as in FIG. 1 is the same as that of Embodiment 1. The photovoltaic power generation amount prediction device 1 of Embodiment 3 includes a prediction formula memory 102, a post-estimation memory 104, and a post-estimation evaluator 105 in addition to the components of the configuration of Embodiment 1. In addition to the predicted power generation amount calculation, a predicted power generation amount calculator 103 calculates a post-estimation power generation amount that is acquired by inputting the extraterrestrial solar radiation of the time slot into the power generation amount prediction formula corresponding to an actual weather record type of the past time slot to store the post-estimation power generation amount in the post-estimation memory 104. Regarding one photovoltaic power generation system 2, when a difference, between the actual power generation amount of the time slot and the post-estimation power generation amount calculated using the power generation amount prediction formula derived for a date prior to the prediction target day, is within a determined range, a prediction formula deriver 101 applies the power generation amount prediction formula derived for the prior date to the power generation amount prediction formula of the prediction target day.

When the power generation amount of the photovoltaic power generation system 2 is collectively managed by a cloud system and/or the like to predict the power generation amount, if the number of the photovoltaic power generation systems 2 increases, a problem occurs in which, when power generation amount predictions are frequently performed, increases in the numbers of the processes and servers lead to cost increases for each photovoltaic power generation systems 2. Such a problem can be solved by decreasing a frequency of performing processes from the search range setter 12 to the prediction formula deriver 101.

Figure 13:
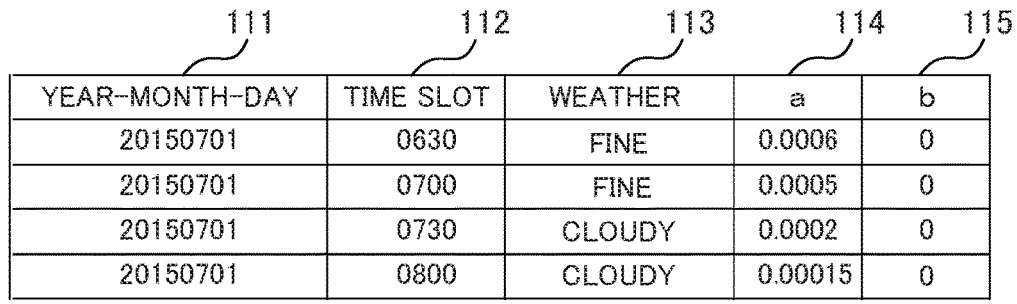
FIG. 13 is a table illustrating an example of a prediction formula stored in a prediction formula memory in Embodiment 3.

The prediction formula deriver 101 performs regression analyses of the similar date sequence (T, W) extracted by the similar date extractor 13 and derives, as the power generation amount prediction formulae, the relational expressions of the extraterrestrial solar radiations and the actual power generation amount of each actual weather record type of each time slot. FIG. 13 is a table illustrating an example of a prediction formula stored in the prediction formula memory 102. The prediction formula deriver 101 derives the prediction formula for each date, for each time slot, for each photovoltaic power generation system ID, and for each weather and outputs the regression coefficients a and b. Then the derived prediction formulae are stored in a year-month-day field 111, a time slot field 112, a weather field 113, a regression coefficient (slope a) field 114, and a regression coefficient (intercept b) field 115 respectively.

In addition to calculation of the predicted power generation amount in a method similar to Embodiment 1, the predicted power generation amount calculator 103 calculates the post-estimation power generation amount and stores the calculated post-estimation power generation amount in the post-estimation memory 104. The post-estimation power generation amount is the predicted power generation amount that is acquired by inputting the extraterrestrial solar radiation of the time slot into the power generation amount prediction formula of the time slot corresponding to the actual weather record type of the past time slot. The post-estimation power generation amount is termed such because the post-estimation power generation amount is a value calculated in the power generation amount prediction formula corresponding to the actual weather record type after the actual weather record is determined. There are cases in which the actual weather record is different from the weather forecast when the predicted power generation amount is calculated. Thus the difference between the actual power generation amount and a preliminarily calculated predicted power generation amount includes the difference between the weather forecast and the actual weather record. Since the post-estimation power generation amount is a value calculated in the power generation amount prediction formula in accordance with the actual weather record type, the post-estimation power generation amount indicates an error of the power generation amount prediction formula.

Figure 14:
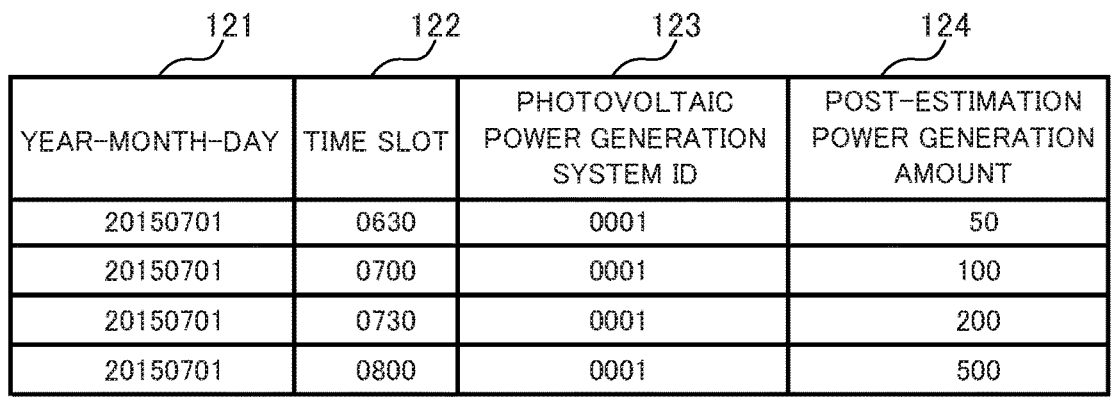
FIG. 14 is a table illustrating an example of a post-estimation power generation amount stored in a post-estimation memory in Embodiment 3.
Figure 15:
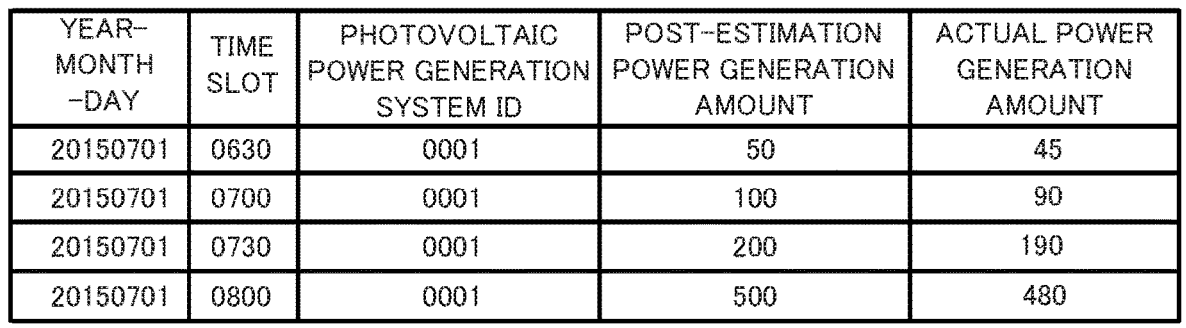
FIG. 15 is a table illustrating an example of power generation amount data in Embodiment 3 in which an actual power generation amount stored in an actual power generation amount memory and a post-estimation power generation amount stored in the post-estimation memory are integrated.

FIG. 14 is a table illustrating an example of the post-estimation power generation amount stored in the post-estimation memory in Embodiment 3. The post-estimation power generation amount is calculated for each date, for each time slot and for each photovoltaic power generation system ID. The predicted power generation amount calculator 103 stores the date, the time slot, the photovoltaic power generation system ID and the calculated post-estimation power generation amount in a year-month-day field 121, a time slot field 122, a photovoltaic power generation system ID field 123, and a post-estimation power generation amount field 124 of the post-estimation memory 104 respectively. The post-estimation power generation amount stored in the post-estimation memory 104 and the actual power generation amount managed in the actual power generation amount memory 5 may be integrated and stored in one memory as power generation amount data. FIG. 15 is a table illustrating an example of power generation amount data in Embodiment 3 in which an actual power generation amount stored in the actual power generation amount memory and the post-estimation power generation amount stored in the post-estimation memory are integrated. In FIG. 15, the post-estimation power generation amount and the actual power generation amount are associated with a set of the date, the time slot and the photovoltaic power generation system ID, and stored.

The post-estimation evaluator 105 acquires, from the post-estimation memory 104 and the actual power generation amount memory 5, records having the same values of the respective year-month-date field, the time slot field, and the photovoltaic power generation system ID field, and compares a value of the power generation amount field 24 of FIG. 2 that is the actual power generation amount and a value of the post-estimation power generation amount field 124 of FIG. 14 that is the post-estimation power generation amount. When the relationship of these values satisfies a predetermined condition, regarding the time slot or the photovoltaic power generation system 2, processes of the search range setter 12 through the prediction formula deriver 101 are performed and the power generation amount prediction formula of the prediction target time slot is derived.

The predetermined condition occurs: when an error between the actual power generation amount and the post-estimation power generation amount exceeds a predetermined allowable range, when a difference between an error and another error of the previous day exceeds an allowable range, an error is greater to a certain extent than another error of another photovoltaic power generation systems 2 on the same day, or the like. The error here is: a value of a difference between the actual power generation amount and the post-estimation power generation amount, an absolute value of the difference of the actual power generation amount and the post-estimation power generation amount, the value of the difference between the actual power generation amount and the post-estimation power generation amount divided by the actual power generation amount, a value of a difference between the actual power generation amount and the predicted power generation amount being divided by the rated output of the photovoltaic power generation system 2, or the like.

The post-estimation evaluator 105 calculates and evaluates an error for the time slot that is the same as the prediction target time slot in which the actual power generation amount just before the prediction execution time is acquired. The post-estimation evaluator 105 may calculate and evaluate the error for a similar type time slot, which is the same time slot as the most recent prediction target time slot of the prediction target day, and in which the weather forecast type of the prediction target time slot and the actual weather record type are the same.

When the error between the actual power generation amount and the post-estimation power generation amount does not meet the predetermined condition, in other words, the error between the actual power generation amount and the post-estimation power generation amount is within the predetermined and allowable range, the processes of the search range setter 12 and the similar date extractor 13 are not performed. In that case, the prediction formula deriver 101 is stored in the prediction formula memory 102. The power generation amount prediction formula of the error evaluated time slot is used without modification and is set to be the power generation amount prediction formula of the prediction target time slot.

The photovoltaic power generation amount prediction device 1 of Embodiment 3 has the above-mentioned configuration. Thus the photovoltaic power generation amount prediction device 1 of Embodiment 3 can reduce processing frequencies of the search range setter 12 and the similar date extractor 13 having much computational complexity, and can simplify the processing contents of the prediction formula deriver 101. Thus, processing loads of implementation systems and the number of servers can be decreased to reduce costs.

When the photovoltaic power generation amount prediction device 1 of Embodiment 3 is achieved using one server, the prediction device 1 is also the photovoltaic power generation amount prediction device. Also in Embodiment 3, similar to FIG. 7, a configuration can be employed in which the photovoltaic power generation amount prediction device 1 is shared by the server that performs up to the prediction formula derivation and the terminal that receives the power generation amount prediction formula and calculates the predicted power generation amount. In addition to the components of the configuration of FIG. 7, the server, for example, includes the prediction formula memory 102, the post-estimation memory 104, the post-estimation evaluator 105 and the post-estimation power generation amount calculator that calculates the post-estimation power generation amount. In that case, the server is the photovoltaic power generation amount prediction device. The server can further serve as one terminal. The configuration may calculate and store the post-estimation power generation amount at a terminal, and notify the server of the result of the post-estimation evaluation.

A configuration can be employed, similar to FIG. 8, in which the photovoltaic power generation amount prediction device 1 of Embodiment 3 is shared by the server that performs up to the similar date extraction and the terminal that receives the similar date, derives the prediction formula and calculates the predicted power generation amount. In addition to the components of configuration of FIG. 8, the terminal, for example, includes the prediction formula memory, the post-estimation memory and the post-estimation evaluator. In that case, the terminal instructs the server whether the server extracts the similar date. In this case the terminal is the photovoltaic power generation amount prediction device.

Embodiment 3 can be applied to Embodiment 2. In that case, the actual power generation amount and the post-estimation power generation amount of the representative system are compared and the error is evaluated. Furthermore, the error of the comparison of the actual power generation amount and the post-estimation power generation amount of the representative system, and the error of the comparison of the actual power generation amount and the post-estimation power generation amount of a system other than the representative system, are compared, and if the error of the system other than the representative system exceeds the predetermined range, a configuration may be formed in which selection of the representative system or a group structure is revised. In this way, the representative system or the group structure based on the actual situation can be acquired.

Embodiment 4

Figure 16:
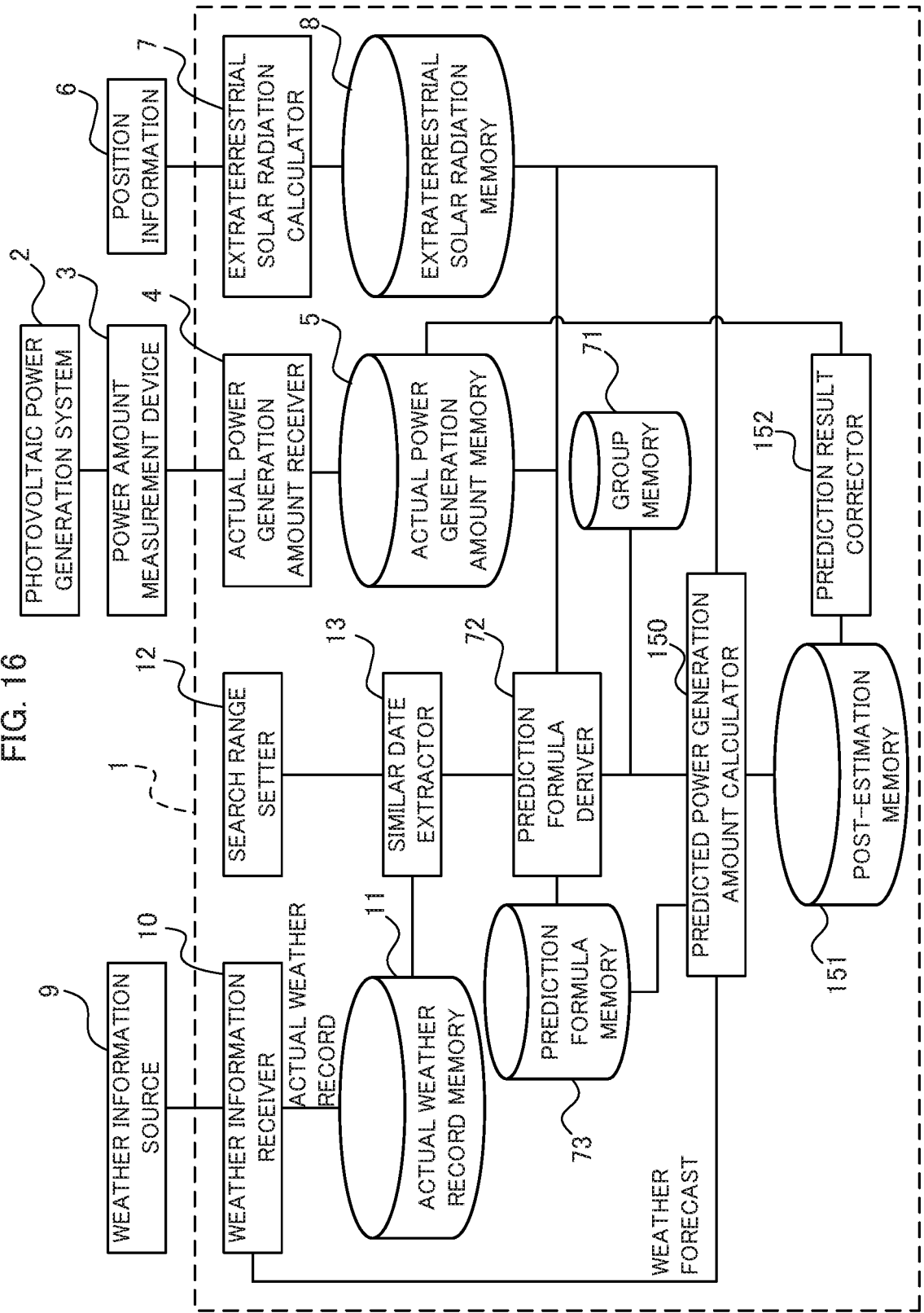
FIG. 16 is a block diagram illustrating a configuration example of a photovoltaic power generation amount prediction device according to Embodiment 4 of the present disclosure.

FIG. 16 is a block diagram illustrating a configuration example of a photovoltaic power generation amount prediction device according to Embodiment 4 of the present disclosure. A component to which the same number is assigned as in FIG. 1 or FIG. 9 is the same as that of Embodiment 1 or Embodiment 2 respectively. In Embodiment 4, similar to Embodiment 2, the photovoltaic power generation system 2 is classified into groups, and the power generation amount prediction formula derived for the representative system is applied to the whole group. In Embodiment 4, the error is evaluated in which the power generation amount prediction formula of the representative system is used for the photovoltaic power generation system 2 other than the representative system, and the predicted power generation amount is corrected.

There are cases in which, when multiple photovoltaic power generation systems 2 are put together to form a group, the power generation amount prediction formula is made based on the relationship of the extraterrestrial solar radiation and the actual power generation amount of the representative system of the group, and the power generation amount prediction formula of the representative system is applied to another photovoltaic power generation systems 2 in the same group to calculate the predicted power generation amount, and a geographical difference of the representative system and the prediction target photovoltaic power generation system 2 and/or geographic characteristics of the prediction target photovoltaic power generation system 2 are sometimes not reflected in the prediction. For example, when a difference in longitudes of the representative system and the prediction target photovoltaic power generation system 2 is great and the representative system is located in the east of the prediction target photovoltaic power generation system 2, the sun rises and the sun sets at an earlier time at the location of the representative system. Therefore, if the prediction is assumed to be performed using the regression coefficient of the power generation amount prediction formula of the representative system, the prediction target photovoltaic power generation system 2 is supposed to output the predicted power generation amount always in such a manner that the power generation is started earlier than the actual power generation and finished earlier. Occasionally, when there is a high tree or a building around the prediction target photovoltaic power generation system 2 and no high tree or building around the representative system, a panel of the photovoltaic power generation system 2 is sometimes shaded in some of the time slots, and the power generation amount is decreased. In such a case, power generation amount reductions cannot always be predicted if the predicted power generation amount is calculated using the regression coefficient of the power generation amount prediction formula of the representative system.

The photovoltaic power generation amount prediction device 1 of Embodiment 4 includes, in addition to the components of the configuration of Embodiment 2, a post-estimation memory 151 and a prediction result corrector 152. Similar to the predicted power generation amount calculator 103 of Embodiment 3, a predicted power generation amount calculator 150 calculates the post-estimation power generation amount and stores such in the post-estimation memory 151. In Embodiment 4, as the post-estimation power generation amount is calculated in the power generation amount prediction formula of the representative system, the post-estimation power generation amount is referred to as a group post-estimation power generation amount. The group post-estimation power generation amount stored in the post-estimation memory 151 is similar to the post-estimation power generation amount of FIG. 14 or FIG. 15.

At first, from the post-estimation memory 151 and the actual power generation amount memory 5, the prediction result corrector 152 acquires a record having the same values of the respective year-month-date field, the time slot field, and the photovoltaic power generation system ID field, compares the value of the power generation amount field 24 that is the actual power generation amount and the value of the post-estimation power generation amount field 124 that is the post-estimation power generation amount, and calculates those differences as individual errors. The individual errors are, for example, the difference of the actual power generation amount and the post-estimation power generation amount, a ratio of the actual power generation amount and the post-estimation power generation amount, time differences of the power generation start time (assumed to be the sunrise) or the power generation end time (assumed to be the sunset) of the actual power generation amount and the post-estimation power generation amount in a day, and/or the like. The prediction result corrector 152 outputs, as a corrected predicted power generation amount, a value of the predicted power generation amount of the prediction target time slot calculated by the predicted power generation amount calculator 150 in which the individual error is taken into account.

More specifically, the prediction result corrector 152 calculates the individual error of the similar type time slot, which is the same time slot as the most recent prediction target time slot of the prediction target day, and in which the weather forecast type of the prediction target time slot and the actual weather record type are the same. Then, the prediction result corrector 152 outputs the corrected predicted power generation amount in which the individual error is taken into account in the predicted power generation amount of the prediction target time slot.

The photovoltaic power generation amount prediction device 1 of Embodiment 4 having the above-explained configuration can perform the power generation amount prediction reflecting geographical and topographical differences between the representative system and the prediction target photovoltaic power generation system 2.

When the photovoltaic power generation amount prediction device 1 of Embodiment 4 is achieved with one server, the prediction device 1 is also the photovoltaic power generation amount prediction device. Also in Embodiment 4, similar to FIG. 7, a configuration can be employed in which the photovoltaic power generation amount prediction device 1 is shared by the server that performs up to the prediction formula derivation and the terminal that receives the power generation amount prediction formula and calculates the predicted power generation amount. In addition to the components of the configuration of FIG. 7, the terminal, for example, includes the post-estimation memory 151 and the prediction result corrector 152, and includes the predicted power generation amount calculator 150 in place of the predicted power generation amount calculator 15. In that case, the server is the photovoltaic power generation amount prediction device. In that case, the server can further serve as one terminal.

Embodiment 3 can be applied to Embodiment 4. In that case, the actual power generation amount and the post-estimation power generation amount of the representative system are compared and the error is evaluated.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. A photovoltaic power generation amount prediction device, comprising circuitry configured to:
acquire an actual power generation amount of a photovoltaic power generation system of each time slot of each day;
calculate an extraterrestrial solar radiation of each time slot of each day at a disposition position of the photovoltaic power generation system;
acquire an actual weather record of each time slot of each day of an area including the disposition position of the photovoltaic power generation system;

classify a time slot that is the same as a prediction target time slot of each day as a similar prediction target time slot for each actual weather record type of the time slot; and derive a power generation amount prediction formula of an actual weather record type for calculating a predicted power generation amount of the photovoltaic power generation system from an extraterrestrial solar radiation of the prediction target time slot based on the actual power generation amount and the extraterrestrial solar radiation of the similar prediction target time slot of the actual weather record type.

2. The photovoltaic power generation amount prediction device according to claim 1, wherein the circuitry is further configured to:

set a weight corresponding to at least one value of:
a number of days difference from the prediction target day;
a difference in day of the year from the prediction target day; or
a temperature difference from a temperature forecast on the prediction target day, and
perform a regression analysis of the extraterrestrial solar radiation and the actual power generation amount of the similar prediction target time slot using a weighted least squares method to derive the power generation amount prediction formula.

3. The photovoltaic power generation amount prediction device according to claim 1, wherein the circuitry is further configured to:

acquire a weather forecast of the prediction target time slot of a prediction target day; and
calculate a predicted power generation amount of the prediction target time slot by inputting an extraterrestrial solar radiation of the prediction target time slot in a power generation amount prediction formula of the same actual weather record type as a weather forecast type of the prediction target time slot.

4. The photovoltaic power generation amount prediction device according to claim 3, further comprising:

a group memory to associate and store a group identification code including one or more of the photovoltaic power generation systems with an identification code of the photovoltaic power generation system included in the group, wherein the circuitry is further configured to:
derive, for each group, the power generation amount prediction formula regarding a representative system taking the one predetermined photovoltaic power generation system included in the group as the representative system; and
input the extraterrestrial solar radiation of the prediction target time slot in the power generation amount prediction formula derived based on the representative system of the group to which the photovoltaic power generation system belongs, and calculates the predicted power generation amount of the prediction target time slot of the photovoltaic power generation system.

5. The photovoltaic power generation amount prediction device according to claim 1, wherein the circuitry is further configured to:

set a search range to a period in which the actual power generation amount of the photovoltaic power generation system is acquired; and
classify a time slot the same as a prediction target time slot of each day in the search range as a similar prediction target time slot for each actual weather record type of the time slot.

6. The photovoltaic power generation amount prediction device according to claim 5, wherein the circuitry is further configured to:

set as the search ranges:
a first period starting from a number of first searching days prior to a prediction target day in a past year until a number of second searching days after the prediction target day in the past year; and
a second period starting from the number of first searching days prior to the prediction target day until a prediction execution day.

7. The photovoltaic power generation amount prediction device according to claim 6, wherein the circuitry is further configured to:

increase or decrease the number of first searching days and the number of second searching days so that the number of the similar prediction target time slots is within a set range for each actual weather record type.

8. A photovoltaic power generation amount prediction device, comprising circuitry configured to:

acquire a weather forecast of a prediction target time slot of a prediction target day of an area including a disposition position of a photovoltaic power generation system;
classify a time slot that is the same as a prediction target time slot of each day as a similar prediction target time slot for each actual weather record type of the time slot and to acquire a power generation amount prediction formula of an actual weather record type for calculating a predicted power generation amount of the photovoltaic power generation system from an extraterrestrial solar radiation of the prediction target time slot based on the actual power generation amount and the extraterrestrial solar radiation at the disposition position of the photovoltaic power generation system of the similar prediction target time slot of the actual weather record type;
acquire an extraterrestrial solar radiation of the prediction target time slot at the disposition position of the photovoltaic power generation system; and
calculate a predicted power generation amount of the prediction target time slot by inputting the extraterrestrial solar radiation of the prediction target time slot in a power generation amount prediction formula corresponding to the same actual weather record type as a weather forecast type of the prediction target time slot among the power generation amount prediction formulae.

9. A photovoltaic power generation amount prediction method performed by a photovoltaic power generation amount prediction device that predicts a power generation amount of a photovoltaic power generation system of each time slot of each day, comprising:

acquiring an actual power generation amount of the photovoltaic power generation system of each time slot of each day;
calculating an extraterrestrial solar radiation of each time slot of each day at a disposition position of the photovoltaic power generation system;
acquiring an actual weather record of each time slot of each day of an area including the disposition position of the photovoltaic power generation system and a weather forecast of a prediction target time slot of a prediction target day;
setting a search range to a period in which an actual power generation amount of the photovoltaic power generation system is acquired;

classifying a time slot that is the same as the prediction target time slot of each day in the search range as a similar prediction target time slot for each actual weather record type of the time slot;

deriving a power generation amount prediction formula of an actual weather record type for calculating a predicted power generation amount of the photovoltaic power generation system from an extraterrestrial solar radiation of the prediction target time slot based on the actual power generation amount and the extraterrestrial solar radiation of the similar prediction target time slot of the actual weather record type; and calculating a predicted power generation amount of the prediction target time slot by inputting an extraterrestrial solar radiation of the prediction target time slot in a power generation amount prediction formula of the same actual weather record type as a weather forecast type of the prediction target time slot.

* * * * *